(12) United States Patent
Marwah et al.

(10) Patent No.: US 10,949,403 B2
(45) Date of Patent: *Mar. 16, 2021

(54) POLICY DRIVEN DATA PLACEMENT AND INFORMATION LIFECYCLE MANAGEMENT

(71) Applicant: Oracle International Corporation, Redwood Shores, CA (US)

(72) Inventors: Vineet Marwah, San Ramon, CA (US); Hariharan Lakshmanan, Belmont, CA (US); Ajit Mylavarapu, Mountain View, CA (US); Prashant Gaharwar, San Carlos, CA (US); Amit Ganesh, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/804,394

(22) Filed: Mar. 14, 2013

(65) Prior Publication Data

US 2014/0095449 A1  Apr. 3, 2014

Related U.S. Application Data

(60) Provisional application No. 61/707,685, filed on Sep. 28, 2012.

(51) Int. Cl.
*G06F 16/185* (2019.01)
*G06F 16/21* (2019.01)
(Continued)

(52) U.S. Cl.
CPC .......... *G06F 16/185* (2019.01); *G06F 3/0649* (2013.01); *G06F 16/113* (2019.01);
(Continued)

(58) Field of Classification Search
USPC .......................................................... 707/668
See application file for complete search history.

(56) References Cited

U.S. PATENT DOCUMENTS 5,680,573 A * 10/1997 Rubin et al. ............ G06F 12/08
                                                       711/118
5,933,838 A    8/1999 Lomet
                        (Continued)

FOREIGN PATENT DOCUMENTS

WO    WO 01/82118 A2    11/2001

OTHER PUBLICATIONS

Lambert, Bob, "DMBI Tech Tip: Include Audit Columns on all Tables", CapTech Venrures, dated Jan. 12, 2011, 2 pages.
(Continued)

*Primary Examiner* — Muluemebet Gurmu
(74) *Attorney, Agent, or Firm* — Hickman Becker Bingham Ledesma LLP

(57) ABSTRACT

A method, apparatus, and system for policy driven data placement and information lifecycle management in a database management system are provided. A user or database application can specify declarative policies that define the movement and transformation of stored database objects. The policies are associated with a database object and may also be inherited. A policy defines, for a database object, an archiving action to be taken, a scope, and a condition before the archiving action is triggered. Archiving actions may include compression, data movement, table clustering, and other actions to place the database object into an appropriate storage tier for a lifecycle phase of the database object. Conditions based on access statistics can be specified at the row level and may use segment or block level heatmaps. Policy evaluation occurs periodically in the background, with actions queued as tasks for a task scheduler.

32 Claims, 8 Drawing Sheets

(51) Int. Cl.
*G06F 16/22* (2019.01)
*G06F 16/27* (2019.01)
*G06F 16/11* (2019.01)
*G06F 3/06* (2006.01)

(52) U.S. Cl.
CPC ............ *G06F 16/21* (2019.01); *G06F 16/217* (2019.01); *G06F 16/22* (2019.01); *G06F 16/27* (2019.01)

(56) References Cited

U.S. PATENT DOCUMENTS

| | | |
|---|---|---|
| 6,223,344 B1 | 4/2001 | Gerard |
| 7,251,669 B1 | 7/2007 | Arora et al. |
| 7,328,192 B1* | 2/2008 | Stengard et al. ........ G06F 15/18 707/999.001 |
| 8,280,853 B1 | 10/2012 | Lai |
| 8,316,051 B1* | 11/2012 | Burns et al. ............ G06F 17/30 707/694 |
| 8,346,747 B2 | 1/2013 | Liu et al. |
| 8,547,379 B2 | 10/2013 | Pacheco |
| 8,688,654 B2 | 4/2014 | Groseclose |
| 8,994,755 B2 | 3/2015 | Robinson |
| 9,275,063 B1 | 3/2016 | Natanzon |
| 9,798,490 B1 | 10/2017 | Natanzon |
| 10,037,271 B1 | 7/2018 | Andersen |
| 10,360,192 B1 | 7/2019 | Sela |
| 2003/0055807 A1 | 3/2003 | Lomet |
| 2003/0101133 A1 | 5/2003 | DeFrancesco |
| 2003/0105732 A1 | 6/2003 | Kagalwala et al. |
| 2003/0236781 A1 | 12/2003 | Lei |
| 2004/0098383 A1* | 5/2004 | Tabellion et al. ....... G06F 17/30 707/999.003 |
| 2004/0117407 A1* | 6/2004 | Kumar et al. ................. 707/200 |
| 2005/0027749 A1 | 2/2005 | Ohno |
| 2005/0149584 A1 | 7/2005 | Bourbonnais et al. |
| 2005/0256897 A1 | 11/2005 | Sinha |
| 2006/0085485 A1 | 4/2006 | Shimshoni |
| 2006/0101052 A1* | 5/2006 | Netrakanti ............. G06Q 10/00 |
| 2006/0218127 A1* | 9/2006 | Tate et al. .......................... 707/3 |
| 2007/0088912 A1 | 4/2007 | Mukherjee |
| 2007/0156790 A1 | 7/2007 | Sun Hsu et al. |
| 2007/0198552 A1 | 8/2007 | Farrand |
| 2007/0208665 A1* | 9/2007 | Ohara .............................. 705/51 |
| 2008/0021859 A1 | 1/2008 | Berkhin |
| 2008/0040505 A1* | 2/2008 | Britto et al. .................. 709/238 |
| 2008/0098045 A1 | 4/2008 | Radhakrishnan et al. |
| 2008/0235183 A1 | 9/2008 | Draese et al. |
| 2008/0250073 A1 | 10/2008 | Nori et al. |
| 2008/0294697 A1 | 11/2008 | Andrasak et al. |
| 2009/0070382 A1 | 3/2009 | Agrawal et al. |
| 2009/0177622 A1 | 7/2009 | Hu et al. |
| 2009/0187544 A1 | 7/2009 | Hsu et al. |
| 2009/0198729 A1 | 8/2009 | Gong |
| 2010/0070535 A1 | 3/2010 | Irun-Briz |
| 2010/0077168 A1 | 3/2010 | Arakawa |
| 2010/0274827 A1 | 10/2010 | Hix et al. |
| 2010/0287178 A1 | 11/2010 | Lambert |
| 2011/0082842 A1 | 4/2011 | Groseclose et al. |
| 2011/0106863 A1 | 5/2011 | Mamidi |
| 2011/0179066 A1 | 7/2011 | Cardno |
| 2011/0282830 A1 | 11/2011 | Malige |
| 2012/0011329 A1 | 1/2012 | Nonaka |
| 2012/0030247 A1 | 2/2012 | Yambal et al. |
| 2012/0042130 A1 | 2/2012 | Peapell |
| 2012/0137059 A1* | 5/2012 | Yang et al. ................... 711/104 |
| 2012/0137061 A1 | 5/2012 | Yang |
| 2012/0144098 A1 | 6/2012 | Yang |
| 2012/0144099 A1 | 6/2012 | Yang |
| 2012/0173477 A1 | 7/2012 | Coutts |
| 2012/0185648 A1 | 7/2012 | Benhase et al. |
| 2012/0233129 A1 | 9/2012 | Brinkmoeller |
| 2012/0260040 A1* | 10/2012 | Mallge et al. .......... G06F 12/08 711/117 |
| 2013/0013850 A1 | 1/2013 | Baderdinni |
| 2013/0073788 A1 | 3/2013 | Post |
| 2013/0151804 A1 | 6/2013 | Alatorre |
| 2013/0155118 A1 | 6/2013 | Robinson |
| 2013/0169666 A1 | 7/2013 | Pacheco |
| 2013/0169966 A1 | 7/2013 | Pacheco |
| 2013/0325326 A1 | 12/2013 | Blumenberg |
| 2014/0033120 A1 | 1/2014 | Bental |
| 2014/0095438 A1 | 4/2014 | Marwah et al. |
| 2014/0095442 A1 | 4/2014 | Guo et al. |
| 2014/0095448 A1 | 4/2014 | Marwah et al. |
| 2014/0095450 A1 | 4/2014 | Marwah et al. |
| 2014/0122778 A1 | 5/2014 | O'Brien |
| 2014/0244623 A1 | 8/2014 | King |
| 2015/0170382 A1 | 6/2015 | Bhatia |
| 2018/0253443 A1 | 9/2018 | Marwah |
| 2019/0370229 A1 | 12/2019 | Guo |

OTHER PUBLICATIONS

Ahmed et al., "Lifecycle Management of Relational Records for External Auditing and Regulatory Compliance", IEEE, dated 2011.
Verma et al., "An Architecture for Lifecycle Management in Very Large File Systems", Mass Storage Systems and Technologies, dated 2005, IEEE, 9 pages.
Chen et al., "Information Valuation for Information Lifecycle Management", Autonomic Computing, dated 2005, 12 pages.
Lambert, Bob, "DMBI Tech Tip: Include Audit Columns on all Tables Cap Tech Consulting", dated Jan. 12, 2011, 2 pages.
U.S. Appl. No. 13/826,075, filed Mar. 14, 2013, Interview Summary, dated Nov. 18, 2015.
U.S. Appl. No. 13/804,581, filed Mar. 14, 2013, Interview Summarry, dated Nov. 16, 2015.
U.S. Appl. No. 13/804,581, filed Mar. 14, 2013, Office Action, dated Nov. 19, 2015.
U.S. Appl. No. 13/751,865, filed Jan. 25, 2013, Final Office Action, dated Nov. 4, 2015.
U.S. Appl. No. 13/804,884, filed Mar. 14, 2013, Final Office Action, dated Apr. 28, 2016.
U.S. Appl. No. 13/750,873, filed Jan. 25, 2013, Final Office Action, dated Jun. 2, 2016.
Chi, Ed Huai-Hsin, "A Framework for Information Visualization Spreadsheets", PhD. diss., University of Minnesota, dated 1999, 160 pages.
Chi et al., "Principles for Information Visualization Spreadsheets", IEEE, Computer Graphics and Applications 4, dated 1998, 9 pages.
Marwah, U.S. Appl. No. 13/826,075, filed Mar. 14, 2013, Notice of Allowance, dated Oct. 11, 2017.
Marwah, U.S. Appl. No. 13/804,884, filed Mar. 14, 2013, Office Action, dated Sep. 29, 2017.
Guo, U.S. Appl. No. 13/750,865, filed Jan. 25, 2013, Interview Summary, dated Nov. 22, 2017.
Ren et al., "A New Buffer Cache Design Exploiting Both Temporal and Content Localities", IEEE, dated 2010, 11 pages.
Marwah, U.S. Appl. No. 13/804,581, filed Mar. 14, 2013, Final Office Action, dated Jan. 22, 2018.
Guo, U.S. Appl. No. 13/750,865, filed Jan. 25, 2013, Advisory Action, dated Dec. 6, 2017.
Marwah, U.S. Appl. No. 13/804,884, filed Mar. 14, 2013, Interview Summary, dated Dec. 18, 2018.
Marwah, U.S. Appl. No. 13/804,581, filed Mar. 14, 2013, Notice of Allowance, dated Jan. 24, 2019.
Hirschtein et al., "White Paper Unlocking the Potential of Information Lifecycle Managemnt: Usage-based Data Classification for Oracle Databases", dated Aug. 15, 2007, 20 pages.
Anonymous:, "Implementing Information Lifecycle Management Using the ILM Assistant", dated Aug. 16, 2007, 42 pages.
Oracle Help Center, "Database SQL Language Reference", dated 1996, 10 pages.
Burns, Derrick, "Bulk Indexing Terabytes of Time-based Data", Elasticsearch, Discuss the Elastic Stack, dated Jan. 2012, 7 pages.
Marwah, U.S. Appl. No. 15/912,314, filed Mar. 5, 2018, Notice of Allowance, dated May 15, 2020.

(56) References Cited

OTHER PUBLICATIONS

Marwah, U.S. Appl. No. 15/912,314, filed Mar. 5, 2018, Final Office Action, dated Jan. 21, 2020.
Marwah, U.S. Appl. No. 15/912,314, filed Mar. 5, 2018, Office Action, dated Aug. 23, 2018.
Marwah, U.S. Appl. No. 15/912,314, filed Mar. 5, 2018, Office Action, dated Aug. 1, 2019.
Marwah, U.S. Appl. No. 15/912,314, filed Mar. 5, 2018, Final Office Action, dated Apr. 2, 2019.
Marwah, U.S. Appl. No. 15/912,314, filed Mar. 5, 2018, Advisory Action, dated Jul. 5, 2019.
Marah, U.S. Appl. No. 15/912,314, filed Mar. 5, 2018, Advisory Action, dated Apr. 17, 2020.

* cited by examiner

FIG. 1B

POLICY CREATION STATEMENT 150

{OBJECT}
 ILM ADD {POLICY | POLICY_NAME}
 {ACTION}
 {SCOPE}
 {CONDITION}

POLICY MANAGEMENT STATEMENT 151

{OBJECT} ILM {DELETE [ALL] |
             ENABLE [ALL] |
             DISABLE [ALL] }
 POLICY [POLICY_NAME]

OBJECT CLAUSE 152A

CREATE TABLE TableName |
ALTER TABLE TableName |
ALTER TABLE TableName MODIFY PARTITION PartitionName |
CREATE TABLESPACE TablespaceName DEFAULT |
ALTER TABLESPACE TablespaceName DEFAULT

ACTION CLAUSE 152B

COMPRESS FOR CompLevel |
TIER TO Tablespace_Name [READ ONLY]
CLUSTERING CLUSTER BY Cluster (Cluster Key list)
INDEXING OFF

SCOPE CLAUSE 152C

SEGMENT | GROUP | ROW

CONDITION CLAUSE 152D

AFTER {Num DAY[S] | MONTH[S] | YEAR[S]}
 OF {NO ACCESS | NO MODIFICATON | CREATION}

FIG. 1C

DATA DICTIONARY 140

ILM POLICY TABLE 142

POLICY 143A

Policy_Name: BackgroundCompressAllRows
Object: CompanyTS (Tablespace)
Action: COMPRESS FOR OLTP INPLACE
Scope: ROW
Condition: AFTER 1 DAY OF NO MODIFICATION

POLICY 143B

Policy_Name: CompressOrdersTable
Object: Orders (Table)
Action: COMPRESS FOR QUERY HIGH
Scope: GROUP
Condition: AFTER 1 MONTH OF NO MODIFICATION

POLICY 143C

Policy_Name: OffloadOldOrdersToLongTermStorage
Object: Orders (Table)
Action: TIER TO ArchiveTS (Tablespace)
Scope: GROUP
Condition: (ON FULLNESS THRESHOLD)

POLICY 143D

Policy_Name: ArchiveOffloadedTables
Object: Orders (Table)
Action: COMPRESS FOR ARCHIVE HIGH
Scope: SEGMENT
Condition: AFTER 60 DAYS OF NO MODIFICATION

FIG. 1E

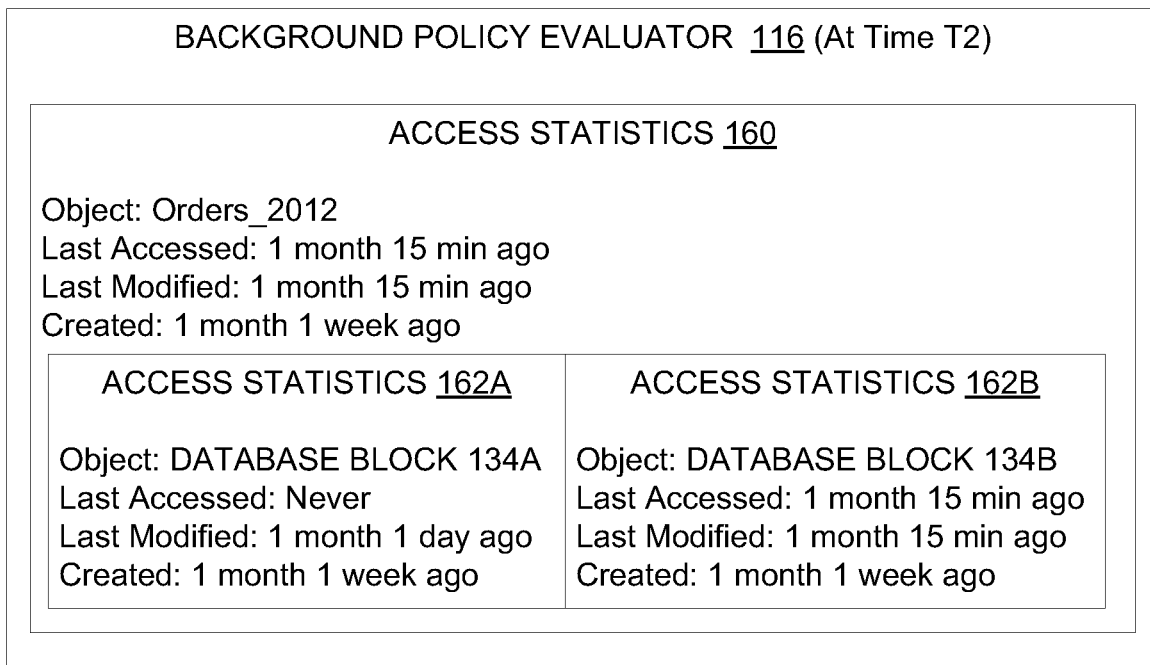

BACKGROUND POLICY EVALUATOR 116 (At Time T2)

ACCESS STATISTICS 160

Object: Orders_2012
Last Accessed: 1 month 15 min ago
Last Modified: 1 month 15 min ago
Created: 1 month 1 week ago

ACCESS STATISTICS 162A

Object: DATABASE BLOCK 134A
Last Accessed: Never
Last Modified: 1 month 1 day ago
Created: 1 month 1 week ago

ACCESS STATISTICS 162B

Object: DATABASE BLOCK 134B
Last Accessed: 1 month 15 min ago
Last Modified: 1 month 15 min ago
Created: 1 month 1 week ago

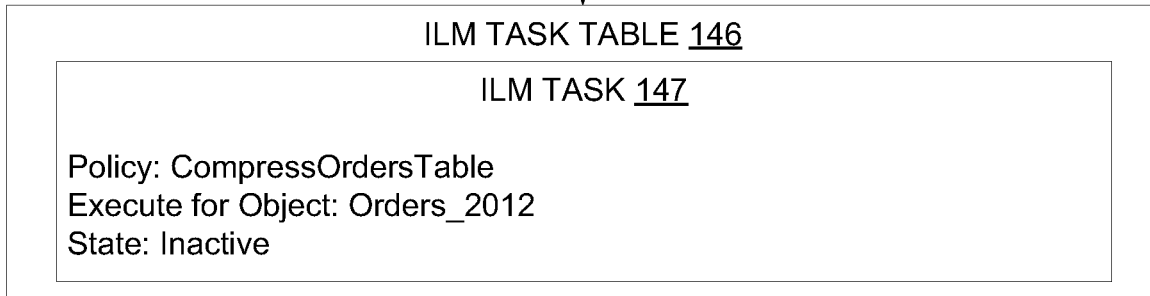

ILM TASK TABLE 146

ILM TASK 147

Policy: CompressOrdersTable
Execute for Object: Orders_2012
State: Inactive

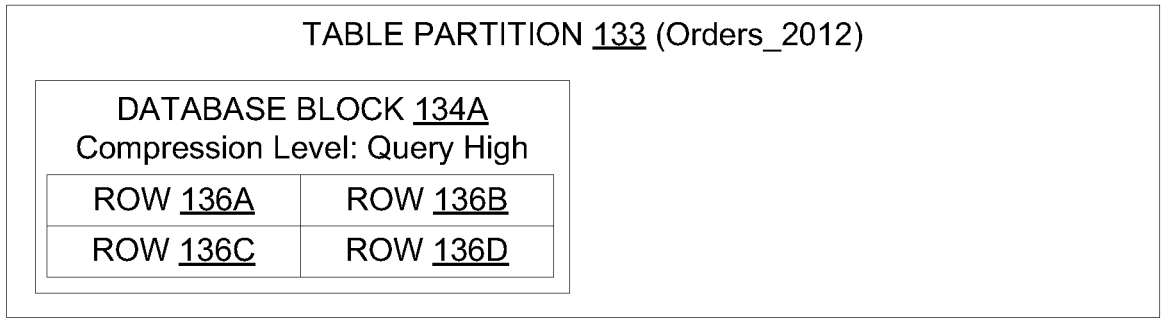

TABLE PARTITION 133 (Orders_2012)

DATABASE BLOCK 134A
Compression Level: Query High

| ROW 136A | ROW 136B |
| ROW 136C | ROW 136D |

202
Receive a policy to associate with a database object in a database, the policy specifying a condition for triggering an archiving action on a stored representation of the database object

204
Determine that the condition is satisfied for the database object

206
Queue a task for executing the archiving action on the stored representation of the database object, wherein the queuing is in response to the determining

208
Perform the task

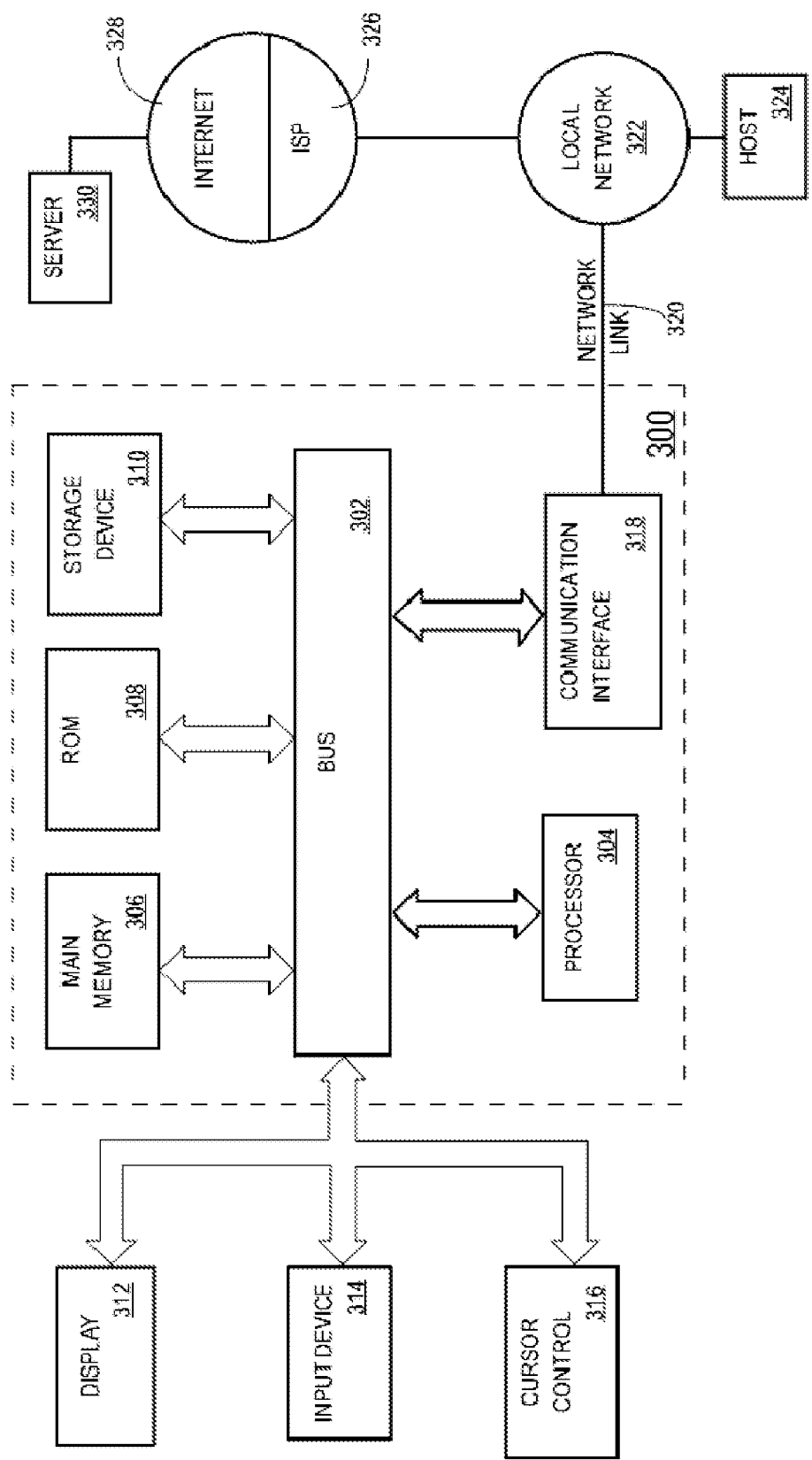

POLICY DRIVEN DATA PLACEMENT AND INFORMATION LIFECYCLE MANAGEMENT

CROSS-REFERENCE TO RELATED APPLICATIONS; BENEFIT CLAIM

This application claims the benefit of U.S. Provisional Application No. 61/707,685, filed Sep. 28, 2012, which is hereby incorporated by reference in its entirety. This application is related to "Tracking Row and Object Database Activity into Block Level Heatmaps", U.S. patent application Ser. No. 13/804,884 filed Mar. 14, 2013; "Techniques for Activity Tracking, Data Classification, and In Database Archiving", U.S. patent application Ser. No. 13/750,873 filed Jan. 25, 2013; and "Techniques for Lifecycle State Management and In-Database Archiving", U.S. patent application Ser. No. 13/750,865 filed Jan. 25, 2013; the entire contents of these patents are hereby incorporated by reference as if fully set forth herein.

FIELD OF THE INVENTION

The present disclosure relates to databases, and more specifically, to policy driven data placement and information lifecycle management.

BACKGROUND

Data is generated and stored at ever increasing rates in organizations both governmental and corporate. While some business data almost never loses its value, the usefulness of most data tends to decline over time until it has no further value for almost any purpose. Generally, the value of business information tends to be the greatest soon after the data is created and remains active for only a short period of time, at most a few years, after which the data's importance to the business, and thus the data's general usage, begins to decline. However, many businesses are constrained by factors, such as legal mandates, requiring data to be retained long after the data's usefulness has expired.

As a result, it has been commonly observed that users access at times as little as 10%-20% of the data stored within a database. The other 80-90% of data is rarely, if ever, accessed by users and yet contributes to the bulk of the storage costs required to maintain the database. To make matters worse, as the volume of data stored by the database increases, performance becomes degraded due to slower full table scans and elongated application upgrades.

Thus, faced with rising storage costs and deteriorating system performance, businesses have sought ways to efficiently manage their database's inactive data. At present, many businesses try to achieve this goal by resorting to third party archiving solutions that offload inactive data out of the database and into archival storage. While these solutions help to ameliorate the effects of accelerated data production, businesses employing third party archiving solutions tend to replace one problem with a host of others.

As one issue, third party archiving solutions tend to lack intimate knowledge of the format and contents of the database. For instance, many third party archiving solutions only work at the level of the file system and therefore can only archive at the granularity of a file. Thus, while a third party archiving solution may be able to offload the individual files that make up the database, the third party archiving solution may not be able to selectively offload individual database elements.

Furthermore, the third party archiving solution may detect inactive data based on file level metrics, such as the frequency or recency with which files are accessed, but may be unable to detect inactivity at the granularity of an individual database element. Consequently, when a database file contains both active and inactive data, third party archiving solutions may be unable to identify and archive only the inactive data. This issue can be exacerbated by database implementations that store data as flat files, where an entire table, or even the entire database, may be contained within a single large file on the file system.

To work around the inability of third party archiving solutions to separate inactive data beyond the granularity of a file, a database administrator may instead manually separate active and inactive data objects into different database files. For example, the database administrator may explicitly move inactive data objects to a separate tablespace, which can then be offloaded to archival storage. However, this workaround introduces heavy database administration burdens, as implementing and validating the required application schema modifications is not a trivial task. For example, the database administrator may be required to discern data access patterns from redo logs and develop customized scripts to separate the inactive data. Moreover, an offline database maintenance window is usually reserved to execute the schema modifications, negatively impacting database availability.

Based on the foregoing, there is a need for an efficient way of organizing inactive data in a database while simplifying database management.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B is a block diagram that depicts an example declarative statement syntax to define policies for data movement and information lifecycle management in a database management system, according to an embodiment;

FIG. 1C is a block diagram that depicts example policies for data movement and information lifecycle management in a database management system, according to an embodiment;

FIG. 1E is a block diagram that depicts an example evaluation of a policy for data movement and information lifecycle management, according to an embodiment;

FIG. 2 is a flow diagram that depicts a process for policy driven data movement and information lifecycle management, according to an embodiment;

FIG. 3 is a block diagram of a computer system on which embodiments may be implemented.

DETAILED DESCRIPTION

Figure 1A:
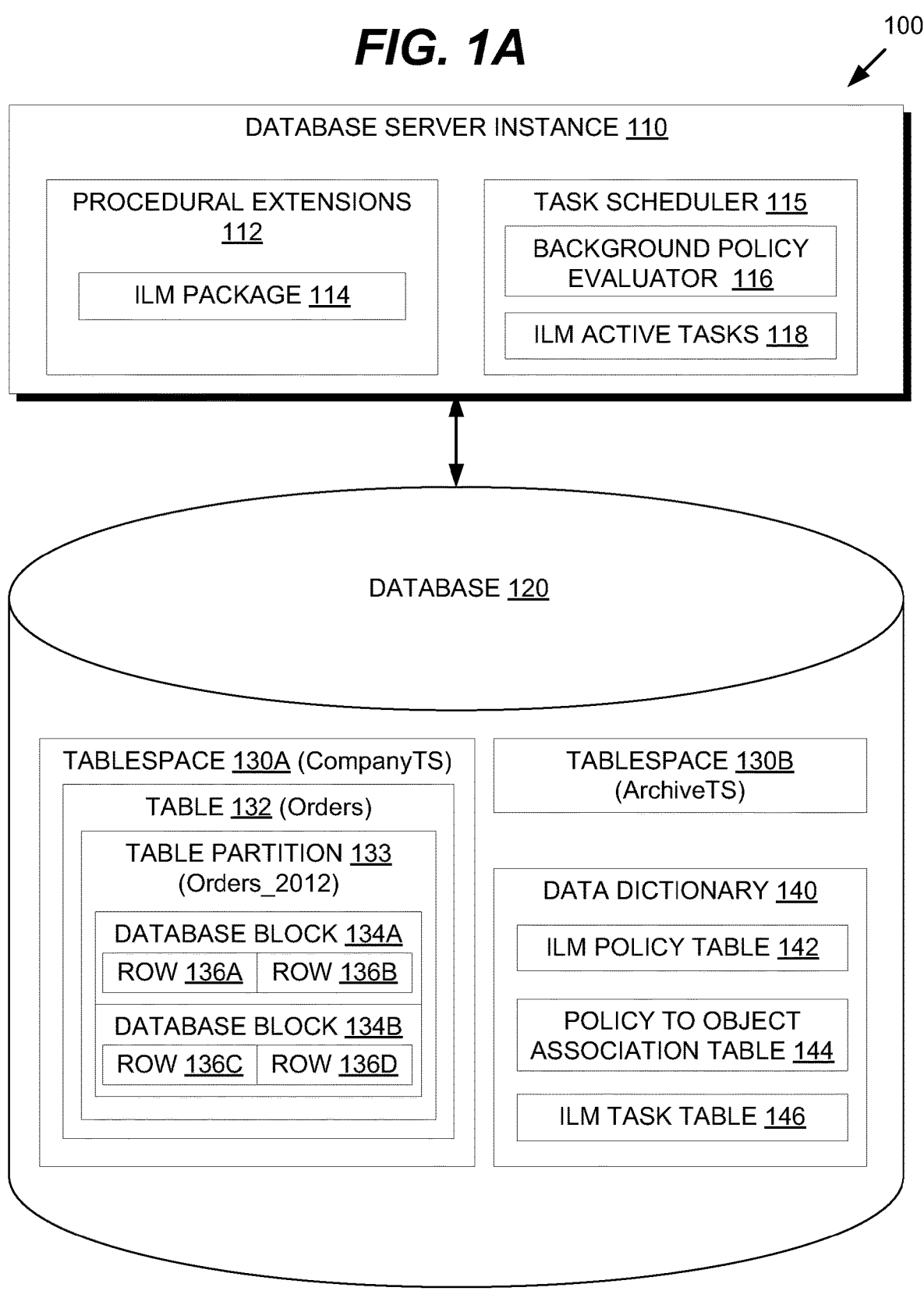
FIG. 1A is a block diagram that depicts an example database management system for policy driven data movement and information lifecycle management, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a database management system ("DBMS") provides policy driven data placement and information lifecycle management. The term information lifecycle management refers to the effective management of information, such as database rows or records, throughout the various lifecycle phases of its useful life, from high relevance phases to low relevance phases, from creation to disposal. To implement information lifecycle management in a DBMS, a user or database application can specify declarative policies that define the movement and transformation of stored database objects into storage tiers according to various conditions. The policies are associated with a database object and may also be inherited from policies on parent database objects.

A policy defines, for a database object, an archiving action to be taken, a scope, and a condition before the archiving action is triggered. Archiving actions may include compression, data movement, table clustering, and other actions to place the database object in an appropriate storage tier for a lifecycle phase of the database object, where a storage tier may represent a type of storage medium and/or the technique used to compress or store the data on the storage medium, as defined further in Database Systems below.

The scope may be defined to be the segment, group, or row. The condition may specify the database object meeting a minimum period of inactivity, which may be based on access statistics derived from a segment level or block level heatmap of the database, as more fully described in the patent titled "Tracking Row and Object Database Activity into Block Level Heatmaps".

The policies may be evaluated on an adjustable periodic basis. A task is queued to execute an associated archiving action for each evaluated policy that satisfies its condition. The queue of tasks may be processed by a resource aware task scheduler, allowing the tasks to be carried out automatically in the background with minimal overhead and database performance impact. Thus, policies may be used to defer compression and other high overhead actions to the background. Tasks on the same database object may also be consolidated where possible for greater efficiency.

Since policy evaluation occurs in the background without any user intervention, management and administration tasks are limited to a one-time initial definition of the policies. By defining policies on a tablespace and utilizing policy inheritance, the policies can also be automatically associated with future database objects without any user intervention. Archiving actions may be specified down to the row scope, allowing inactive data to be optimized at the finest granularity level of rows. Accordingly, a database management system can implement policy driven data movement and information lifecycle management with fine grained optimizations while maintaining high performance and low maintenance.

Database Systems

Embodiments of the present invention are used in the context of DBMSs. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

A database dictionary, also referred to herein as a data dictionary, comprises metadata that defines database objects physically or logically contained in a database. In effect, a database dictionary defines the totality of a database. Database objects include tables, indexes, views, columns, data types, users, user privileges, and storage structures, such as tablespaces, which are used for storing database object data.

A tablespace is a database storage unit that groups related logical structures together, and contains one or more physical data files. These logical structures may include segments, or an allocation of space for a specific database object such as a table, a table cluster, or an index. A segment may be contained in one data file or may span across multiple data files. A segment may be defined using a set of extents, where an extent contains one or more contiguous database blocks.

A database block, also referred to as a data block, is a unit of persistent storage. A database block is used by a database server to store database records (e.g. to store rows of a table, to store column values of a column). When records are read from persistent storage, a database block containing the record is copied into a database block buffer in volatile memory of a database server. A database block usually contains multiple rows, and control and formatting information, (e.g. offsets to sequences of bytes representing rows or other data structures, list of transactions affecting a row).

A database block is referred to as being atomic because, at least in part, a database block is the smallest unit of database data a database server may request from a persistent storage device. For example, when a database server seeks a row that is stored in a database block, the database server may only read the row from persistent storage by reading in the entire database block.

A database object such as a tablespace or a segment may be assigned to a particular storage tier. A storage tier denotes a particular balance between access speed and storage cost. Each storage tier may represent a different type or quality of storage medium. In general, as the access speed of a storage medium increases the price to purchase that storage medium tends to increase as well. As a result, many businesses have a limited amount of premium storage space with the fastest access speed and a much larger amount of secondary or tertiary storage space which is slower, but cheaper to purchase in bulk. Thus, in order to maximize the performance of a DBMS, data with higher operational relevance can be placed on faster storage mediums, such as top-quality disk drives, while data with lesser operational relevance can be placed on slower storage mediums, such as optical disks or tape drives.

Each storage tier may also represent a storage area where the data is compressed using a different technique. Similar to the choice of storage medium, each compression technique also represents a tradeoff, in this case between access speed and storage space. More specifically, compression techniques that achieve higher compression ratios also tend to take longer to decompress when accessing the data. Thus, in order to maximize the performance of a database management system, data with higher operational relevance can be stored uncompressed to allow faster access, while data with lower operational relevance can be compressed to save space. Storage tiers may represent a combination of both storage medium and the technique used to compress or store data on the storage medium.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a syntax of a database language. One example language for expressing database commands is the Structured Query Language (SQL). SQL data definition language ("DDL") instructions are issued to a DBMS to define database structures such as tables, views, or complex data types. For instance, CREATE, ALTER, DROP, and RENAME, are common examples of DDL instructions found in some SQL implementations. SQL data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Although the examples described above are based on Oracle's SQL, the techniques provided herein are not limited to Oracle's SQL, to any proprietary form of SQL, to any standardized version or form of SQL (ANSI standard),or to any particular form of database command or database language. Furthermore, for the purpose of simplifying the explanations contained herein, database commands or other forms of computer instructions may be described as performing an action, such as creating tables, modifying data, and setting session parameters. However, it should be understood that the command itself performs no actions, but rather the DBMS, upon executing the command, performs the corresponding actions. Thus, such statements as used herein, are intended to be shorthand for commands, that when executed by the DBMS, cause the DBMS to perform the corresponding actions.

In most cases, a DBMS executes database commands as one or more transactions, sets of indivisible operations performed on a database. Thus, after executing a given transaction, the database is left in a state where all the transaction's operations have been performed or none of the transaction's operations have been performed. While implementations may differ, most transactions are performed by, 1) beginning the transaction, 2) executing one or more data manipulations or queries, 3) committing the transaction if no errors occurred during execution, and 4) rolling back the transaction if errors occurred during execution. Consequently, a DBMS may maintain logs keeping track of committed and/or uncommitted changes to the database. For example, in some implementations of SQL, executing database commands adds records to REDO and UNDO logs, which can be used to implement rollback, database recovery mechanisms, and features such as flashback queries.

A multi-node database management system is made up of interconnected nodes that share access to the same database. Typically, the nodes are interconnected via a network and share access, in varying degrees, to shared storage, e.g. shared access to a set of disk drives and database blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

System Overview

FIG. 1A is a block diagram that depicts an example database management system 100 for policy driven data movement and information lifecycle management, according to an embodiment. Database management system 100 of FIG. 1A includes database server instance 110 and database 120. Database server instance 110 includes procedural extensions 112 and task scheduler 115. Procedural extensions 112 include information lifecycle management (ILM) package 114. Task scheduler 115 includes background policy evaluator 116 and ILM active tasks 118. Database 120 includes tablespace 130A, tablespace 130B, and data dictionary 140. Tablespace 130A includes table 132. Table 132 includes table partition 133. Table partition 133 includes database block 134A and database block 134B. Database block 134A includes row 136A and row 136B. Database block 134B includes row 136C and row 136D. Data dictionary 140 includes ILM policy table 142, policy to object association table 144, and ILM task table 146.

While database management system 100 only shows a single database server instance 110, embodiments may include multiple database server instances supported by one or more nodes. Thus, database management system 100 may be a multi-node database system. Further, while database 120 is shown as stored on a single storage element, database 120 may be supported by any type of underlying storage volume such as tiered storage and disk arrays across multiple local and/or networked physical disks. For example, tablespace 130A may be stored on a high cost, high performance array of solid state disks, whereas tablespace 130B may be stored on a low cost array of hard disk drives. The storage volumes may be interfaced using an automatic storage manager, a logical volume manager, a clustered file system, or another storage layer.

Database server instance 110 is a server instance of database 120. ILM policies for database 120 can be defined through the use of new ILM policy clauses in database commands issued to database server instance 110. Database server instance 110 may also support procedural commands via procedural extensions 112, for example by supporting Procedural Language/Structured Query Language (PL/SQL). Accordingly, ILM package 114 may also be provided, allowing database users and applications to perform advanced management and customization of ILM policies.

Once a policy clause is received by database server instance 110, it may be parsed and stored within ILM policy table 142 of data dictionary 140. The policy may be associated with specific database objects in policy to object association table 144. Since policies can be inherited from parent objects, policy to object association table 144 may map a policy to various database objects at different scopes within database 120. For example, a policy specified on tablespace 130A may be associated with tablespace 130A at the tablespace scope, with table 132 at the table scope, and with table partition 133 at the table partition scope. Furthermore, any new or future database objects created in tablespace 130A will also inherit the policy specified on tablespace 130A.

Task scheduler 115 may be a multi-instance aware task scheduler that can schedule and delegate tasks to database instances. On a customizable periodic schedule, background policy evaluator 116 may evaluate each policy in ILM policy table 142. If a policy has its condition satisfied with respect to any of the mappings in policy to object association table 144, then a task may be generated for that mapping, with the task queued into ILM task table 146. Policies that can occur only once for a particular database object may be disabled after triggering to reduce future parsing time.

Task scheduler 115 may operate in the background, consuming the queue in ILM task table 146 to delegate tasks to database instances according to available resources, such as memory and processor cycles. Thus, tasks from ILM task table 146 may be loaded into ILM active tasks 118 for execution by database server instance 110, which may occur while database 120 is online. Ongoing status of running ILM tasks and results of finished or failed ILM tasks may also be maintained within ILM task table 146. Data structures of database management system 100 such as redo and undo records may be utilized to roll back, recover, and retry failed ILM tasks.

Process Overview

With a basic outline of database management system 100 now in place, it may be instructive to review a high level overview of the processing steps to define and carry out an ILM policy. Turning to FIG. 2, FIG. 2 is a flow diagram that depicts a process 200 for policy driven data movement and information lifecycle management, according to an embodiment.

Receiving a Declarative Policy Statement

At block 202 of process 200, referring to FIG. 1A, database server instance 110 receives a policy to associate with a database object in database 120, the policy specifying a condition for triggering an archiving action on a stored representation of the database object. As discussed above, the policy may be specified as part of an ILM policy clause in a database command, which may be received from a database client user or application. A detailed breakdown of a syntax for the ILM policy clause is shown in FIG. 1B.

FIG. 1B is a block diagram that depicts an example declarative statement syntax to define policies for data movement and information lifecycle management in a database management system, according to an embodiment. Diagram 101 of FIG. 1B includes policy creation statement 150, policy management statement 151, object clause 152A, action clause 152B, scope clause 152C, and condition clause 152D.

Policy creation statement 150 shows the various component clauses for a database statement that creates an ILM policy. First is the {OBJECT} clause, which creates or modifies a database object. Next is the keyword "ILM ADD", which indicates that a new ILM policy is being defined for the database object created or modified in {OBJECT}. After the "ILM ADD" keyword, a friendly [POLICY_NAME] may be given to the ILM policy; otherwise, a schema-unique policy name may be generated automatically by using the POLICY keyword. After the policy name are various components specifying the details of the ILM policy: {ACTION} for the archiving action to execute on the database object, {SCOPE} for the scope, and {CONDITION} for the condition before the archiving action is triggered.

Policy Object Clause

As discussed above, the {OBJECT} clause creates or modifies a database object. Thus, examples are shown in object clause 152A to create a table, to modify a table, and to modify a table partition. In the case of creating or modifying tablespaces, the keyword "DEFAULT" is always appended to the end to emphasize that policies attached to tablespaces propagate hierarchically to child objects of the tablespace. Thus, any future created tables, table partitions, indexes, and other database objects within the tablespace will inherit the defined policy by default. While not specifically shown in object clause 152A, a policy may also be defined on a schema-wide basis, affecting all database objects of a particular database user.

Policy Action Clause

The {ACTION} clause specifies the ILM archiving action to perform on the stored representation of the {OBJECT}. As discussed above, an archiving action places the data object into an appropriate storage tier for a lifecycle phase of the database object, where the storage tier may represent a type of storage medium and/or the technique used to compress or store the data on the storage medium. Action clause 152B shows four example archiving actions. The first example archiving action compresses to a target CompLevel, which may include OLTP, QUERY LOW, QUERY HIGH, ARCHIVE LOW, and ARCHIVE HIGH, in order of lowest to highest compression level. The OLTP level may optionally specify the "INPLACE" keyword to prevent rows from being moved and consolidated, thereby avoiding index rebuilding.

The second example archiving action, "TIER TO", causes data movement of the database object into a target storage container, such as a tablespace. Typically, this is used to move inactive data from a high cost tablespace to a lower cost tablespace, such as from tablespace 130A to tablespace 130B in FIG. 1A. Optionally, the [READ ONLY] keyword may be specified to mark the target tablespace as read-only after moving the database object, which may help to accelerate backup operations.

The third example archiving action clusters a table on a specified cluster and cluster keys. By clustering a table, data that is accessed together can be spatially colocated to improve performance.

The fourth example archiving action disables indexing for a particular database object. When the database object is a table that is split into table partitions, then this action can be used to implement partial indexing, reducing the size and depth of the global index.

Other archiving actions may also be specified that are not specifically listed in action clause 152B. For example, a "move" archiving action may be specified to rebuild and re-sort a database object such as an index-sorted table.

Policy Scope Clause

The {SCOPE} clause specifies the scope with respect to the database object. As shown in scope clause 152C, three scopes are defined. SEGMENT refers only to the segment that contains the database object, for example the segment of a table. GROUP refers to the SEGMENT as well as any dependent objects, such as indexes and large objects (LOBs). ROW refers to individual rows of the database object. For example, if a COMPRESS FOR {ACTION} is specified on the ROW {SCOPE} for a database table, then only those individual rows in the database table meeting the specified {CONDITION} are compressed, leaving the other rows as-is.

Policy Condition Clause

The {CONDITION} clause specifies a pre-condition before the specified {ACTION} is triggered on the {OBJECT}. The first condition in condition clause 152D specifies a minimum period that must be met, where the period is defined by a number of days, months, or years. The minimum period may be specified for no accesses or read and write inactivity on the database object (NO ACCESS), no modifications or write inactivity on the database object (NO MODIFICATION), or a period of time since a creation time of the database object (CREATION). To determine whether the minimum period is met, various access statistics may be utilized, which may be derived from a segment or block level heatmap of the database. In the case of certain {ACTION} clauses, such as the "TIER TO" clause, the {CONDITION} clause may be omitted, since a "TIER TO" clause may implicitly indicate an "ON FULLNESS THRESHOLD" condition, wherein a storage container of the database object, such as a tablespace, meets a fullness threshold.

Policy Association

Once a policy is received according to the syntax shown in policy creation statement 150, database server instance 110 may parse the policy and record the parsed policy into ILM policy table 142. Additionally, the policy may be associated with the database object {OBJECT} as well as all child database objects according to policy inheritance. These associations may be recorded in policy to object association table 144.

ILM Policy Management

After a policy is created for a database object, the policy may be enabled, disabled, or deleted for the database object and its child objects by using the syntax shown in policy management statement 151. Additionally, ILM package 114 may be utilized to provide advanced policy management features. For example, policies may be assigned to execute at specific priority levels, which may affect the scheduling decisions of task scheduler 115. Additionally, a maximum number of concurrent task job executions may be configured, and resource utilization levels may be specified for all ILM tasks in general and/or for specific ILM task jobs. Policies may also be forced to execute their archiving actions regardless of whether their conditions are met.

Additionally, policies may be set to evaluate according to a specified schedule, or forced to immediately evaluate. By default, background policy evaluator 116 may evaluate all policies in ILM policy table 142 according to a periodic time interval, for example every 15 minutes. However, this interval may be too frequent for certain policies that require a long time to evaluate their conditions. In this case, policies may be set to evaluate during a scheduled maintenance window or according to a customized schedule, rather than the default periodic time interval of 15 minutes.

Example ILM Use Case

To provide an example of recorded ILM policies using the syntax discussed above, FIG. 1C is a block diagram that depicts example policies for data movement and information lifecycle management in a database management system, according to an embodiment. Diagram 102 of FIG. 1C includes data dictionary 140. Data dictionary 140 includes ILM policy table 142. ILM policy table 142 includes policy 143A, policy 143B, policy 143C, and policy 143D. With respect to FIG. 1C, like numbered elements may correspond to the same elements from FIG. 1A.

Row Compression Policy

ILM policy table 142 contains several policies that demonstrate an example ILM use case for database 120. For example, to compress new data that is in a high relevance lifecycle phase while maintaining high performance, the database administrator may want to compress rows in the main CompanyTS tablespace with OLTP compression after one day with no modifications, as reflected by policy 143A. Since policy 143A is specified on the CompanyTS tablespace, it is inherited to all future child objects, including table 132 or the Orders table, and table partition 133 or the Orders_2012 partition. Since policy 143A is specified at the row scope, only those rows that are not modified for at least 1 day are compressed with OLTP compression; other rows that have been modified within the last 1 day remain uncompressed for quick modification.

Note that policy 143A effectively defers compression to the background, since the compression is only queued as an ILM task after the one day of no modifications is met, where the ILM tasks are distributed in the background by task scheduler 115. In this manner, resource intensive compression operations that are typically foreground operations at the time of row insertion can now be deferred as background operations to maintain low database latency.

Table Partition Compression Policy

Next, if the table partitions of the Orders table have not been modified for a month, then the table partitions should be compressed to a higher QUERY HIGH level of compression, as reflected in policy 143B, to reflect a medium relevance lifecycle stage. For example, the Orders table may be partitioned by year of order, with Orders_2012 representing all orders for the year 2012. Since policy 143B is specified on the Orders table, all table partitions of the Orders table also inherit policy 143B. Accordingly, if any of the table partitions of the Orders table are idle for 1 month without any modifications, then the table partition may be compressed to the QUERY HIGH level. Since the scope is specified to be GROUP, all dependent indexes and LOBs are also compressed as well.

Automatic Fullness Storage Tiering Policy

If space is running low in the CompanyTS tablespace, then the least active table partitions of the Orders table should be automatically offloaded to low cost storage in the ArchiveTS tablespace, as reflected in policy 143C. As previously described, a "TIER TO" action implicitly indicates an "ON FULLNESS THRESHOLD" condition. Thus, once CompanyTS reaches above a specific fullness threshold, which may be a configurable value, then the table partitions of the Orders table are moved to the ArchiveTS tablespace, in order of least activity, until the fullness of CompanyTS falls below the fullness threshold. For example, the table partitions in the Orders table may be sorted according to database activity, with the least active partitions, as indicated by a last access or modification time, being preferred for movement. Thus, an Orders_2000 table partition that was last accessed 10 years ago will be moved before the Orders_2012 table partition that was last accessed 1 day ago. Since the scope is specified to be GROUP, all dependent indexes and LOBs are also moved.

Note that even if all table partitions of the Orders table are highly active, the least active of those highly active table partitions will nevertheless be tiered to the ArchiveTS tablespace when the CompanyTS tablespace exceeds the fullness threshold. Depending on the operational goals of the database administrator, it may be undesirable to tier highly active data to a low cost tablespace. Thus, before creating a policy with a "TIER TO" action clause, a database administrator may want to consider the activity patterns of the database object to be tiered, the total size and available free space in a tablespace containing the database object, the potential expansion capabilities of the tablespace, and the specific fullness threshold setting.

Archiving Policy

To preserve storage space, policy 143D specifies that Orders (Table) should be compressed to the ARCHIVE HIGH level of compression after 60 days of no modification. Since policy 143D may be triggered immediately after policy 143C, which moves segments from the CompanyTS to the ArchiveTS tablespace, it is possible that an ILM task may be created to consolidate both tasks into a single operation.

Policy Evaluation

Having established an example set of recorded ILM policies, process 200 may continue by using policy 143A as corresponding to the specific policy that was received in block 202. Accordingly, at block 204 of process 200, referring to FIG. 1A, database server instance 110 evaluates policy 143A to determine that the condition is satisfied for the database objects in tablespace 130A (CompanyTS). Since the scope is specified at the row scope, policy to object association table 144 may be used to find the child objects of tablespace 130A that inherited policy 143A and contain rows for testing the condition. For simplicity, only table partition 133 (Orders_2012) is identified from policy to object association table 144.

Figure 1D:
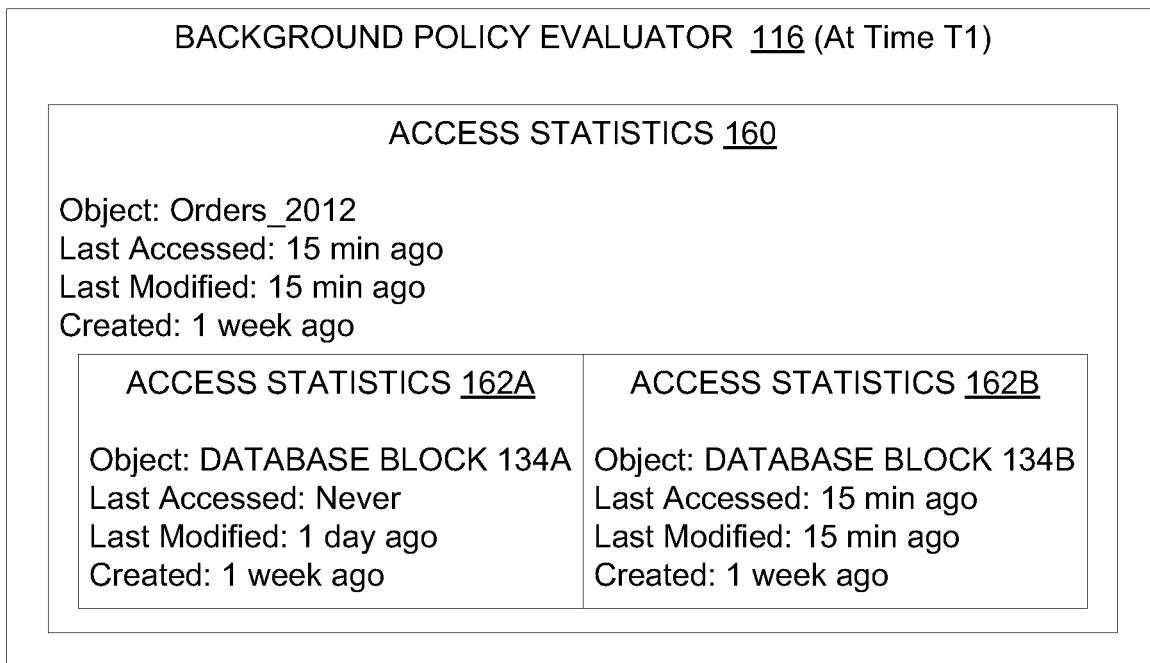
FIG. 1D is a block diagram that depicts an example evaluation of a policy for data movement and information lifecycle management, according to an embodiment.
Figure 1D:
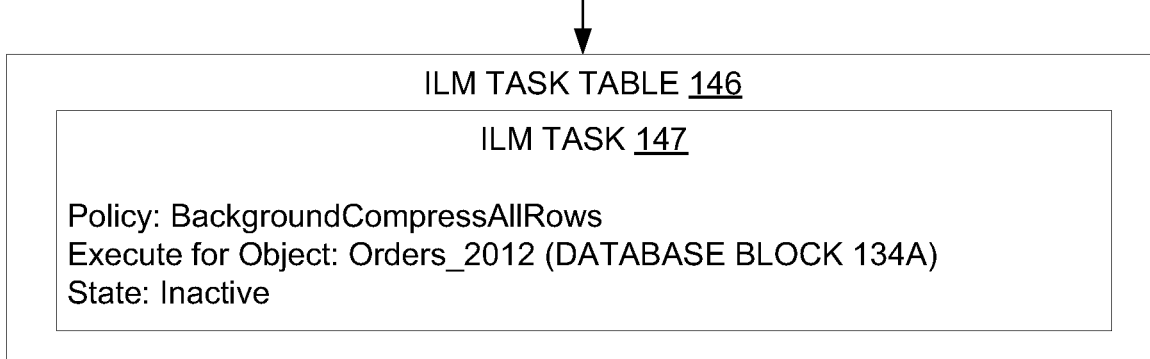
Figure 1D:
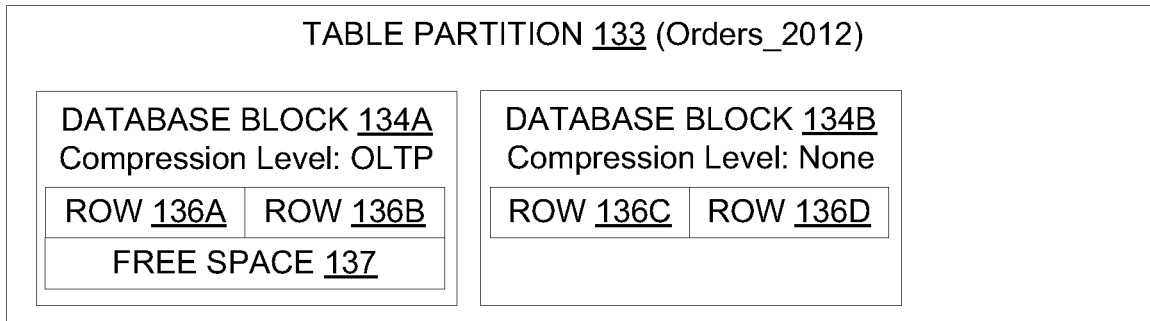

Turning to FIG. 1D, FIG. 1D is a block diagram that depicts an example evaluation of a policy for data movement and information lifecycle management, according to an embodiment. Diagram 103 of FIG. 1D includes background policy evaluator 116, ILM task table 146, and table partition 133. Background policy evaluator 116 includes access statistics 160. Access statistics 160 includes access statistics 162A and access statistics 162B. ILM task table 146 includes ILM task 147. Table partition 133 includes database block 134A and database block 134B. Database block 134A includes row 136A, row 136B, and free space 137. Database block 134B includes row 136C and row 136D. With respect to FIG. 1D, like numbered elements may correspond to the same elements from FIG. 1A.

Background policy evaluator 116, at time T1, initiates an evaluation of policy 143A with respect to table partition 133 (Orders_2012). As previously discussed, evaluation may occur at a default periodic interval or 15 minutes or by a custom schedule. Thus, T1 may indicate a time when the periodic interval or the custom schedule is triggered.

At time T1, background policy evaluator 116 may calculate access statistics 160, for example by using a segment or block level heatmap of database 120. A block level heatmap of database 120 may indicate activity such as a last accessed time, a last modified time, and a creation time for database blocks within database 120. As shown in access statistics 160, with respect to Orders_2012 at time T1, a last access time is 15 minutes ago, a last modified time is 15 minutes ago, and a creation time is 1 week ago. As shown in access statistics 162A, with respect to database block 134A at time T1, a last access time is never, a last modified time is 1 day ago, and a creation time is 1 week ago. As shown in access statistics 162B, with respect to database block 134B at time T1, a last access time is 15 minutes ago, a last modified time is 15 minutes ago, and a creation time is 1 week ago.

Policy 143A is defined as a row scope policy, and the condition is "AFTER 1 DAY OF NO MODIFICATION". Accordingly, access statistics 160 may be searched for all database blocks of the specified database object that have access statistics indicating a "Last Modified" time of 1 day or longer. Access statistics 162A meets this condition, indicating that all rows within database block 134A have not been modified for at least 1 day.

Task Queuing

At block 206 of process 200, referring to FIG. 1A and FIG. 1D, database server instance 110 queues ILM task 147 for executing the archiving action on the rows stored in database block 134A, wherein the queuing is in response to the determining of block 204. Accordingly, ILM task 147 may be queued in ILM task table 146. Since block 204 determined that database block 134A satisfied the condition of policy 143A, ILM task 147 is populated as shown, indicating policy 143A, or the "BackgroundCompressAllRows" policy, to be executed on the rows of Orders_2012 within database block 134A.

Since a block level heatmap is utilized in this example, a condition of the row scope policy is treated as being satisfied for a group of rows within a database block. In alternative embodiments, if a row-specific statistics data source is used rather than a block level heatmap, for example by using access statistics reserved in additional statistics columns of each data row, then tasks for database objects may be queued for individual rows rather than for groups of rows within database blocks. A description of such additional statistics columns is described in the patent "Techniques for Activity Tracking, Data Classification, and In Database Archiving".

As shown in ILM task 147, the task is initially set to an "Inactive" state, awaiting execution. Task scheduler 115 may automatically retrieve and delegate ILM task 147 from the queue in ILM task table 146. However, in some instances, a database administrator may wish to view the queue of tasks and manually approve tasks before allowing execution. In this case, task scheduler 115 may only process queued tasks in ILM task table 146 that are approved by the user.

Task Execution

At block 208 of process 200, referring to FIG. 1A and FIG. 1D, database server instance 110 performs ILM task 147. For example, task scheduler 115 may process a task queue in ILM task table 146 to delegate ILM task 147 to a specific database instance, for example as part of ILM active tasks 118 of database server instance 110. The status of ILM task 147 may thus be updated to "Active".

After database server instance 110 executes the archiving action specified in ILM task 147, the structure of table partition 133 may appear as shown in FIG. 1D, where rows 136A and 136B in database block 134A are compressed to OLTP compression level. Since the "INPLACE" keyword was specified in the action clause of policy 143A, no rows are moved between database blocks, and only free space 137 is reserved within database block 134A, which may be used to store additional rows inserted at a later time. Database block 134B, including rows 136C and 136D, remains uncompressed. The status of ILM task 147 may be updated to "Completed", and ILM task 147 may be removed from ILM active tasks 118.

Evaluating Table Partition Compression

Having reviewed process 200 with respect to policy 143A, it may be useful to review the end result of process 200 with another example policy, such as policy 143B. Turning to FIG. 1E, FIG. 1E is a block diagram that depicts an example evaluation of a policy for data movement and information lifecycle management, according to an embodiment. Diagram 104 of FIG. 1E includes background policy evaluator 116, ILM task table 146, and table partition 133. Background policy evaluator 116 includes access statistics 160. Access statistics 160 includes access statistics 162A and access statistics 162B. ILM task table 146 includes ILM task 147. Table partition 133 includes database block 134A. Database block 134A includes row 136A, row 136B, row 136C, and row 136D. With respect to FIG. 1E, like numbered elements may correspond to the same elements from FIG. 1A.

In FIG. 1E, process 200 may proceed in a similar fashion as described above, but with respect to policy 143B. Since the condition is "AFTER 1 MONTH OF NO MODIFICATION", access statistics 160 can be used to determine that the last modification to table partition 133 (Orders_2012) was 1 month, 15 minutes ago at time T2, which may occur one month after time T1. Note that since policy 143B is group scope, or segment scope with dependent objects, it is not necessary to use the more detailed block level access statistics 162A and 162B. Having met the condition at the segment scope, ILM task 147 is therefore queued with respect to Orders_2012 and any dependent objects, such as indexes as LOBs, which are omitted for simplicity.

Table partition 133 of FIG. 1E reflects a state after ILM task 147 is completed and the archiving action "COMPRESS FOR QUERY HIGH" is executed. Note that since the entire segment for table partition 133 is compressed to the "Query High" level, all of the database blocks may be recreated from scratch to consolidate the rows. Accordingly, a single database block 134A may now be sufficient to store all four rows 136A-136D using the "Query High" compression level. Database block 134B is free and may be used to store other data.

Evaluating Consolidated Tasks

Figure 1F:
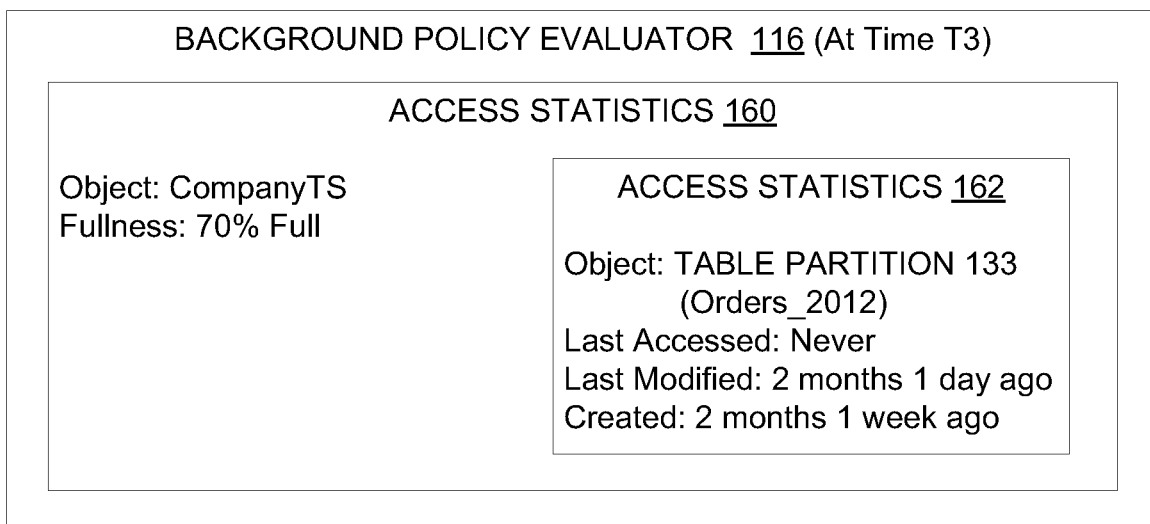
FIG. 1F is a block diagram that depicts an example evaluation of policies for data movement and information lifecycle management, according to an embodiment.
Figure 1F:
Figure 1F:
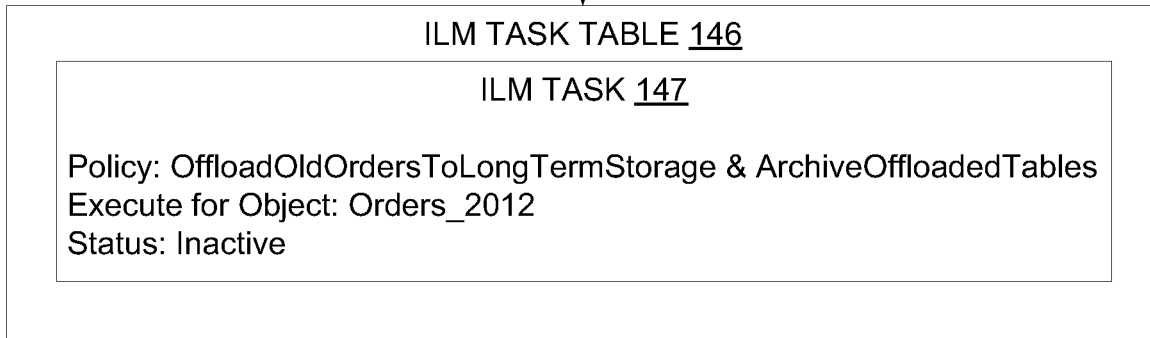
Figure 1F:
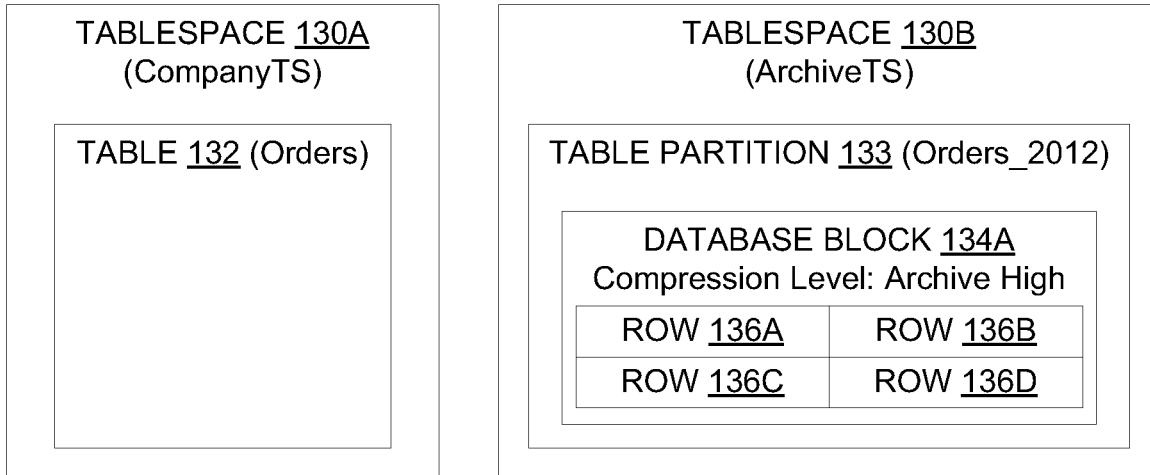

In some cases, multiple tasks may be consolidated into a single operation for higher performance and efficiency. An example is shown in FIG. 1F, where FIG. 1F is a block diagram that depicts an example evaluation of policies for data movement and information lifecycle management, according to an embodiment. Diagram 105 of FIG. 1F includes background policy evaluator 116, ILM task table 146, tablespace 130A, and tablespace 130B. Background policy evaluator 116 includes access statistics 160, which includes access statistics 162. ILM task table 146 includes ILM task 147. Tablespace 130A includes table 132. Tablespace 130B includes table partition 133. Table partition 133 includes database block 134A. Database block 134A includes row 136A, row 136B, row 136C, and row 136D. With respect to FIG. 1F, like numbered elements may correspond to the same elements from FIG. 1A.

In FIG. 1F, process 200 may proceed in a similar fashion as described above, but with respect to policies 143C and 143D. For example, if fullness threshold is calibrated to 60%, then access statistics 160 indicates that the condition "ON FULLNESS THRESHOLD" for policy 143C is met at time T3 after time T2, since tablespace 130A (CompanyTS) is already 70% full. Since policy 143C is defined on the Orders table, the table partitions of the Orders table are sorted by inactivity and the least active partitions are moved to the target, or tablespace 130B (ArchiveTS). Since there is only one table partition, or table partition 133, a task is generated to move table partition 133 to tablespace 130B.

However, in the course of evaluating all of the policies in ILM policy table 142, background policy evaluator 116 may also determine that policy 143D will be satisfied immediately after the above task is completed, since moving the table partition results in a new table partition being created in tablespace 130B (ArchiveTS), and table partition 133 is already inactive for over 60 days, as indicated by access statistics 162. Accordingly, the tasks that have their conditions satisfied on the same database object may be consolidated into a single task, or ILM task 147 as shown, where the archiving action specifies table partition 133 (Orders_2012) to be moved into ArchiveTS ("TIER TO ArchiveTS") and compressed to Archive High ("COMPRESS FOR ARCHIVE HIGH") in a single operation. In this manner, redundant recompression work is avoided that would normally occur when the operations are carried out separately with a first move operation and a second in-place recompression.

As shown in FIG. 1F, the archiving action is executed to move table partition 133 from tablespace 130A to tablespace 130B, where it is compressed at the "Archive High" level. Additionally, since policy 143C is specified at the GROUP scope, any dependent objects of table partition 133, such as indexes and LOBs, may also be moved from tablespace 130A to tablespace 130B.

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    a database management system receiving a policy, that is described in one or more clauses of a database command, to associate with a database object in a database managed by the database management system, wherein said database object is defined by a database dictionary in the database, wherein said database object is stored in a plurality of data blocks, the policy specifying an archiving action on the database object and a condition for triggering the archiving action;
    in response to receiving the policy, the database management system storing,. in the database dictionary, data associating the policy with the database object;
    the database management system examining said data, stored in the database dictionary, associating the policy with the database object to determine that the database object is associated with the policy;
    the database management system determining that the condition is satisfied for the database object;
    in response to determining that the condition is satisfied for the database object:
        the database management system queuing a task, for executing the archiving action on said plurality of data blocks, in a queue of tasks;
        the database management system performing the task based on the task being included in the queue of tasks;
    wherein the method is performed by one or more computing devices.

2. The method of claim 1, wherein the condition comprises an elapse of a minimum period of read inactivity for the database object.

3. The method of claim 1, wherein the condition comprises an elapse of a minimum period of write inactivity for the database object.

4. The method of claim 1, wherein the condition comprises an elapse of a length of time after a creation time of the database object.

5. The method of claim 1, wherein the determining that the condition is satisfied for the database object uses a segment level or block level heatmap of the database.

6. The method of claim 1, wherein the condition is specified for one or more rows of the database object, and wherein the task specifies the archiving action for particular rows, of the one or more rows of the database object satisfying the condition.

7. The method of claim 1, wherein the database command is in the form of a declarative statement of a database language, said declarative statement comprising a clause that specifies said archiving action.

8. The method of claim 1, wherein said database command describes a parent policy that is associated with a parent object of the database object; and wherein the receiving of the policy comprises inheriting the parent policy.

9. The method of claim 1, further comprising associating the policy with a newly created child object of the database object in the database.

10. The method of claim 1, wherein prior to performing the task, the task is consolidated with another task for executing another archiving action on the plurality of data blocks.

11. The method of claim 1, wherein the determining occurs based on performance of a policy evaluation according to a periodic schedule.

12. The method of claim 1, wherein the performing of the task utilizes a resource aware task scheduler of the database.

13. The method of claim 1, wherein the archiving action comprises moving the plurality of data blocks to a target storage structure.

14. The method of claim 1, wherein the archiving action comprises compressing the plurality of data blocks to a target compression level.

15. The method of claim 1, wherein the plurality of data blocks is in a tablespace, wherein the condition comprises the tablespace exceeding a fullness threshold, and wherein the archiving action comprises moving a least active portion of the tablespace to a target tablespace such that the tablespace falls below the fullness threshold.

16. The method of claim 1, wherein the plurality of data blocks are a segment.

17. One or more non-transitory computer-readable media storing one or more sequences of instructions that, when executed by one or more processors, cause:
    a database management system receiving a policy, that is described in one or more clauses of a database command, to associate with a database object in a database, wherein said database object is defined by a database dictionary in the database, wherein said database object is stored in a plurality of data blocks, the policy specifying an archiving action on the database object and a condition for triggering the archiving action;
    in response to receiving the policy, storing, in the database dictionary, data associating the policy with the database object;
    the database management system examining said data, stored in the database dictionary, associating the policy with the database object to determine that the database object is associated with the policy;

the database management system determining that the condition is satisfied for the database object;

in response to determining that the condition is satisfied for the database object:
queuing a task, for executing the archiving action on said plurality of data blocks, in a queue of tasks;
performing the task based on the task being included in the queue of tasks.

18. The one or more non-transitory computer-readable media of claim 17, wherein the determining that the condition is satisfied for the database object uses a segment level or block level heatmap of the database.

19. A database management system comprising one or more computing devices configured to:
receive a policy, that is described in one or more clauses of a database command, to associate with a database object in a database managed by the database management system, wherein said database object is defined by a database dictionary in the database, wherein said database object is stored in a plurality of data blocks, the policy specifying an archiving action on the database object and a condition for triggering the archiving action on a stored representation of the database object;
in response to receiving the policy, store, in the database dictionary, data associating the policy with the database object;
examine said data, stored in the database dictionary, associating the policy with the database object to determine that the database object is associated with the policy;
determine that the condition is satisfied for the database object;
in response to determining that the condition is satisfied for the database object:
queue a task for executing the archiving action on said plurality of data blocks, in a queue of tasks;
perform the task based on the task being included in the queue of tasks.

20. The database management system of claim 19, wherein the determining that the condition is satisfied for the database object uses a segment level or block level heatmap of the database.

21. The one or more non-transitory computer-readable media of claim 17, wherein the performing of the task utilizes a resource aware task scheduler of the database.

22. The database management system of claim 19, wherein the performing of the task utilizes a resource aware task scheduler of the database.

23. The one or more non-transitory computer-readable media of claim 17, wherein the condition is specified for one or more rows of the database object, and wherein the task specifies the archiving action for particular rows, of the one or more rows of the database object, satisfying the condition.

24. The one or more non-transitory computer-readable media of claim 17, wherein the database command is in the form of a declarative statement of a database language, said declarative statement comprising a clause that specifies said archiving action.

25. The one or more non-transitory computer-readable media of claim 17, wherein said database command describes a parent policy that is associated with a parent object of the database object; and wherein the receiving of the policy comprises inheriting the parent policy.

26. The one or more non-transitory computer-readable media of claim 17, wherein the determining occurs based on performance of a policy evaluation according to a periodic schedule.

27. The one or more non-transitory computer-readable media of claim 17, wherein the plurality of data blocks is in a tablespace, wherein the condition comprises the tablespace exceeding a fullness threshold, and wherein the archiving action comprises moving a least active portion of the tablespace to a target tablespace such that the tablespace falls below the fullness threshold.

28. The database management system of claim 19, wherein the condition is specified for one or more rows of the database object, and wherein the task specifies the archiving action for particular rows, of the one or more rows of the database object, satisfying the condition.

29. The database management system of claim 19, wherein the database command is in the form of a declarative statement of a database language, said declarative statement comprising a clause that specifies said archiving action.

30. The database management system of claim 19, wherein said database command describes a parent policy that is associated with a parent object of the database object; and wherein the receiving of the policy comprises inheriting the parent policy.

31. The database management system of claim 19, wherein the determining occurs based on performance of a policy evaluation according to a periodic schedule.

32. The database management system of claim 19, wherein the plurality of data blocks is in a tablespace, wherein the condition comprises the tablespace exceeding a fullness threshold, and wherein the archiving action comprises moving a least active portion of the tablespace to a target tablespace such that the tablespace falls below the fullness threshold.

* * * * *

UNITED STATES PATENT AND TRADEMARK OFFICE
CERTIFICATE OF CORRECTION

| | | |
|---|---|---|
| PATENT NO. | : 10,949,403 B2 | Page 1 of 1 |
| APPLICATION NO. | : 13/804394 | |
| DATED | : March 16, 2021 | |
| INVENTOR(S) | : Marwah et al. | |

It is certified that error appears in the above-identified patent and that said Letters Patent is hereby corrected as shown below:

On the Title Page

Column 2, under Other Publications, Line 2, delete "Venrures," and insert -- Ventures, --, therefor.

On page 2, Column 2, under Other Publications, Lines 12-13, delete "Summarry," and insert -- Summary, --, therefor.

On page 2, Column 2, under Other Publications, Line 44, delete "Managemnt:" and insert -- Management: --, therefor.

In the Claims

In Column 17, Line 50, in Claim 1, delete "storing,." and insert -- storing, --, therefor.

In Column 18, Line 16, in Claim 6, after "object" insert -- , --.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*